United States Patent
Hufenbach et al.

(10) Patent No.: US 10,323,710 B2
(45) Date of Patent: Jun. 18, 2019

(54) BAR-SHAPED COMPONENT LOADED IN TORSION

(71) Applicants: ThyssenKrupp Federn und Stabilisatoren GmbH, Hagen (DE); ThyssenKrupp AG, Essen (DE)

(72) Inventors: Werner Hufenbach, Dresden (DE); Jörn Kiele, Dresden (DE); Martin Lepper, Dresden (DE); Jens Werner, Coswig (DE)

(73) Assignees: THYSSENKRUPP FEDERN UND STABILISATOREN GMBH, Hagen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/302,890

(22) PCT Filed: Apr. 13, 2015

(86) PCT No.: PCT/EP2015/057979
§ 371 (c)(1),
(2) Date: Oct. 7, 2016

(87) PCT Pub. No.: WO2015/158661
PCT Pub. Date: Oct. 22, 2015

(65) Prior Publication Data
US 2017/0058983 A1   Mar. 2, 2017

(30) Foreign Application Priority Data

Apr. 14, 2014   (DE) .................. 10 2014 207 151

(51) Int. Cl.
*F16F 1/36*   (2006.01)
*F16F 1/37*   (2006.01)
(Continued)

(52) U.S. Cl.
CPC ............ *F16F 1/3665* (2013.01); *B29C 70/30* (2013.01); *F16F 1/3605* (2013.01); *F16F 1/366* (2013.01);
(Continued)

(58) Field of Classification Search
None
See application file for complete search history.

(56) References Cited

U.S. PATENT DOCUMENTS 2,852,424 A    9/1958  Reinhart et al.
4,380,483 A *  4/1983  Kliger .................. B29C 53/12
                                                    156/169
(Continued)

FOREIGN PATENT DOCUMENTS

CN    1480658 A    3/2004
CN    103203905 A  7/2013
(Continued)

OTHER PUBLICATIONS

Int'l Search Report for PCT/EP2015/057979 dated Jul. 22, 2015 (dated Jul. 31, 2015).
(Continued)

*Primary Examiner* — Thomas J Williams
*Assistant Examiner* — James K Hsiao
(74) *Attorney, Agent, or Firm* — thyssenkrupp North America, Inc.

(57) ABSTRACT

A torsion spring may be formed as a bar spring or helical spring comprising a spring wire of fiber composite material. In some examples, the torsion spring comprises a number of layers of fiber reinforcement, which are impregnated with a matrix material. The layers may comprise tensile-loaded fibers and compression-loaded fibers. Groups of layers of the same loading direction may exist and, seen from an inside to an outside, the group stiffness of at least two groups
(Continued)

may differ. Likewise, methods for making such torsion springs of fiber composite material are disclosed.

19 Claims, 7 Drawing Sheets

(51) Int. Cl.
*B29C 70/30* (2006.01)
*F16F 1/366* (2006.01)
*F16F 1/373* (2006.01)
*B29L 31/00* (2006.01)

(52) U.S. Cl.
CPC ....... *F16F 1/373* (2013.01); *B29L 2031/7742* (2013.01); *F16F 2224/0241* (2013.01); *F16F 2226/04* (2013.01); *F16F 2230/40* (2013.01); *F16F 2234/02* (2013.01); *F16F 2236/08* (2013.01); *F16F 2238/024* (2013.01)

(56) References Cited

U.S. PATENT DOCUMENTS

| | | | | |
|---|---|---|---|---|
| 4,601,367 A * | 7/1986 | Bongers | ............... | B29D 28/005 138/174 |
| 5,603,490 A | 2/1997 | Folsom | | |
| 5,685,525 A * | 11/1997 | Oguri | ................... | B29C 53/083 267/148 |
| 6,454,251 B1 * | 9/2002 | Fish | ........................ | B29C 53/12 156/149 |
| 7,523,924 B2 * | 4/2009 | Melancon | ................. | E04C 5/02 267/166 |
| 7,857,294 B2 * | 12/2010 | Spencer | .................. | B29C 53/12 267/148 |
| 8,857,801 B2 * | 10/2014 | Yoshioka | ............... | F16F 1/3665 267/149 |
| 9,212,714 B2 * | 12/2015 | Shigematsu | ............ | F16F 1/368 |
| 2002/0190451 A1 * | 12/2002 | Sancaktar | ............... | B29C 53/12 267/166 |
| 2008/0284069 A1 * | 11/2008 | Aulich | ................... | F16F 1/368 267/7 |
| 2014/0021666 A1 | 1/2014 | Yoshioka | | |

FOREIGN PATENT DOCUMENTS

| | | |
|---|---|---|
| DE | 3824933 A1 | 1/1990 |
| EP | 0145810 A1 | 6/1985 |
| EP | 0637700 | 2/1995 |
| FR | 2859735 A1 | 3/2005 |
| JP | S57011742 A | 1/1982 |
| JP | 2006226327 A | 8/2006 |
| RU | 1762034 A1 | 9/1992 |
| WO | 2014014481 A1 | 1/2014 |

OTHER PUBLICATIONS

Helmut Schürmann: Konstruieren mit Faser-Kunststoff-Verbunden [structural design with fiberplastic composites], first adition, Springer Verlag 2005.
Helmut Schürmann: Konstruieren mit Faser-Kunststoff-Verbunden [structural design with fiberplastic composites], first edition, Springer Verlag 2005.
English language Abstract for JP 2006226327 A listed above.
English language Abstract for DE 3824933 A1 listed above.
English language Abstract for EP 0145810 A1 listed above.
English language Abstract for CN 103203905 A listed above.
English language Abstract for CN 1480658 A listed above.

* cited by examiner

BAR-SHAPED COMPONENT LOADED IN TORSION

CROSS REFERENCE TO RELATED APPLICATIONS

This application is a U.S. National Stage Entry of International Patent Application Serial Number PCT/EP2015/057979, filed Apr. 13, 2015, which claims priority to German Patent Application No. DE 10 2014 207 151.8 filed Apr. 14, 2014, the entire contents of both of which are incorporated herein by reference.

FIELD

The present disclosure relates to torsion springs and, more particularly, torsion springs in the form of bar springs or helical springs that include fiber-reinforced plastic, which ensures improved utilization of load-bearing capacities of all material layers.

BACKGROUND

Springs are often used in the chassis of motor vehicles. They are consequently likewise subject to the demands made in striving for lightweight construction, which as the very first consideration are directed at these unsprung masses. In this connection, the use of fiber composite materials (FCM) has already been proposed many times. This applies in particular to torsion springs of carbon fiber reinforced plastics (CRP) or glass fiber reinforced plastics (GRP). It is particularly problematic here to produce these components appropriately for the loading concerned but at the same time at low cost.

A further difficulty is that the fibers can in each case only transfer tensile forces or compressive forces, and consequently the macroscopic shear loading in the spring wire has to be divided into a tensile component and a compression component (with respect to the principal axes of stress, +−45° to the bar axis in accordance with Mohr's theory of stress).

FCM springs that are known today are aimed at accommodating the tensile and compressive force distribution in the material as favorably as possible by means of windings of the fibers at an angle of +/−45° to the bar axis.

Also known are exclusively +45° tensile fiber windings, the shear stress components being borne by the matrix material or by compressive stresses in the core.

The aim in the structural design of suitable springs is for the entire spring material that is used to be utilized homogeneously in terms of loading. It is thus intended that there should not be any dedicated weak points in the material, but rather that the entire material should reach its loading limit under uniform maximum loading. This corresponds to the best possible utilization of the material, and consequently to the best achievable degree of lightweight construction.

EP 0637700 describes a spring construction in which carbon fibers that are wound at an angle of +−30° to +−60° around the bar axis are used. A characterizing feature is that the number of tensile fibers used differs from the number of compression fibers. In particular, the number of compression fibers is increased in comparison with the tensile fibers. The aim of this is a more uniform loading of the fibers, which brings about a better specific utilization of the material used. Although the material is better utilized as a result of the fibers of the tensile direction and the compressive direction being used in different quantitative ratios, or different layer thicknesses, the dependence of the material utilization on the diameter of the spring wire is not eliminated.

U.S. Pat. No. 5,603,490 proposes only using fibers in the tensile direction and no compression-loaded fibers. The fibers are to be wound up in such a way that they are only tensile-loaded. In the case of a spring with a hollow-profile cross section, this would quickly lead to failure due to the shear stresses, for which reason a compressively stable core that absorbs the stresses is required here. However, the constant state of hydrostatic stress in the core and the state of shear stress in the wound fiber envelope lead to a disadvantageous creep of the plastics matrix (epoxy). Therefore, this solution cannot be used for example for applications in vehicle construction (continuous loading due to the weight of the vehicle). Although the use of only one direction for the fibers means that the tensile loading potential of the fibers is optimally used, shear stresses that then have to be transferred for the most part through the plastics matrix due to the lack of compressive fiber support mean that strong creep effects occur under continuous loading.

WO 2014/014481 A1 proposes a fiber construction in which the number of fibers in the layers and the core are multiples of a common base number. The use of a number of different materials in a spring (for example glass, carbon or a mixture) is also disclosed. In addition, it is disclosed that the angles of the individual fibers of the fiber plies in relation to the bar axis can alternate (in particular between a positive angle and a negative angle). The core of the spring may consist of unidirectional fibers, but a solid core or a hollow core is also disclosed. A core of a material with a shape memory is also proposed. Although it is mentioned that the spring material may be composed of mixed materials, no instruction is given, as a result of which the procedure and effect of a mixed type of construction remain unclear. The fibers should be arranged in the layers in a number that is an integral multiple of a common reference base, the effect likewise remaining unclear. This arrangement has the disadvantage that the fibers are only present in the layers in numbers of integral factors, and consequently an optimum layer thickness adaptation is not provided.

The types of spring construction from the prior art do not achieve an optimum degree of lightweight construction, since they do not effectively utilize the material that is used.

BRIEF DESCRIPTION OF THE FIGURES AND TABLES

Figure 1A:
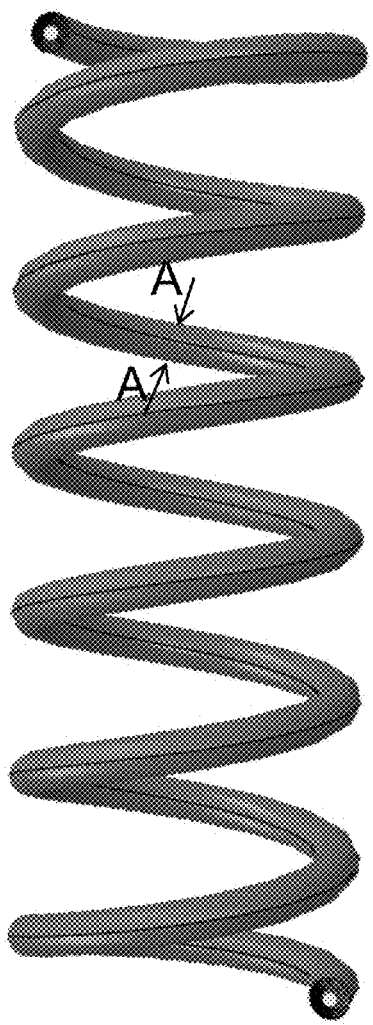
FIG. 1a is a schematic view of an example torsion spring in the form of a helical spring with a core.
Figure 1B:
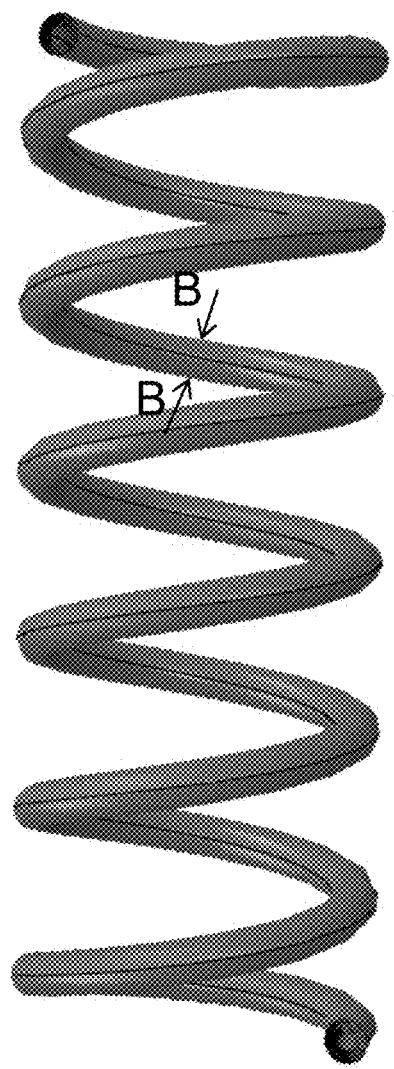
FIG. 1b is a schematic view of an example torsion spring in the form of a helical spring without a core.
Figure 2:
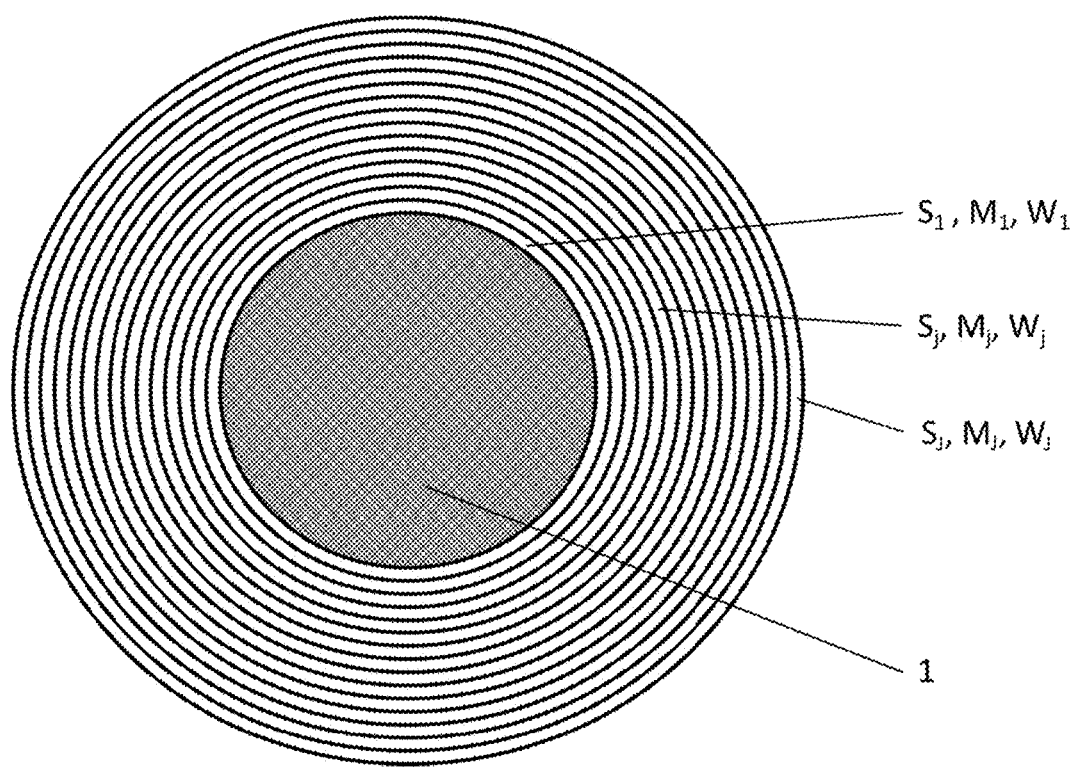
FIG. 2 is a schematic cross-sectional view of an example spring taken from a perspective such as that represented by line A-A in FIG. 1a, wherein the example spring here includes a solid core and multiple layers ($S_1$ to $S_1$) having certain wall thicknesses and material compositions.
Figure 3:
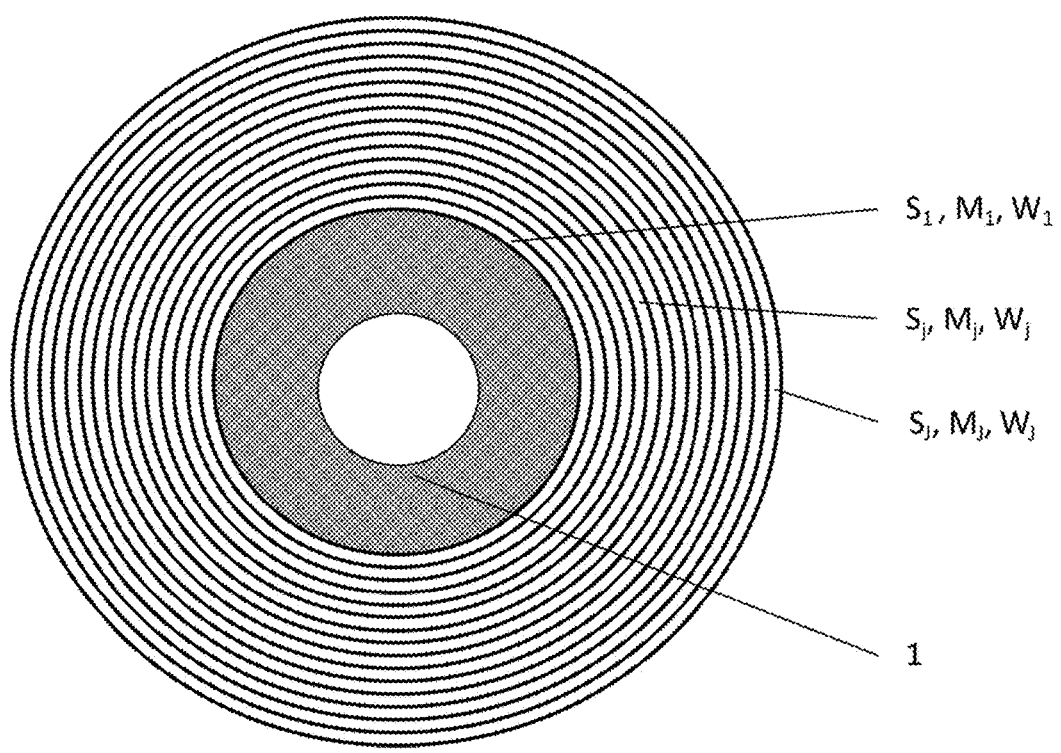
FIG. 3 is a schematic cross-sectional view of an example spring taken from a perspective such as that represented by line A-A in FIG. 1a, wherein the example spring here includes a tubular core and multiple layers ($S_1$ to $S_1$) having certain wall thicknesses and material compositions.
Figure 4:
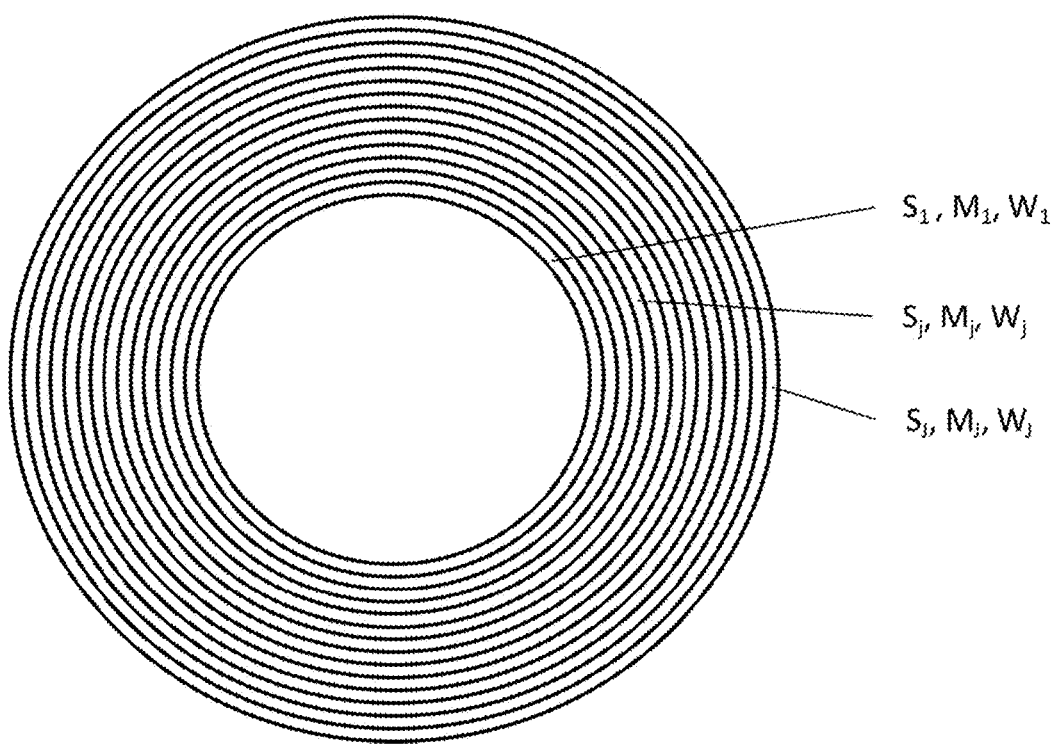
FIG. 4 is a schematic cross-sectional view of an example spring taken from a perspective such as that represented by line B-B in FIG. 1b, wherein the example spring here does not include a core, but does include various layers ($S_1$ to $S_1$) having certain wall thicknesses and material compositions.

Table 1 shows exemplary embodiment 1 of the design method with a braided textile and a core diameter of 4 mm.

Table 2 shows the fiber materials used for exemplary embodiment 1 with their properties, the properties which are known from the prior art and have merely been compiled here.

Table 3 shows exemplary embodiment 2 of the design method with a wound textile such as on a coiling machine, for example, and a core diameter of 3.5 mm.

Table 4 shows the fiber materials used for exemplary embodiment 2 with their properties, the properties which are known from the prior art and have merely been compiled here.

Table 5 shows exemplary embodiment 3 of the design method with a braided textile, the fourth ply being a UD nonwoven fabric and a homogeneous plastic outer ply being arranged on the outside of the spring.

Table 6 shows the fiber materials used for exemplary embodiment 3 with their properties, the properties which are known from the prior art and have merely been compiled here.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

Consequently, one example object of the present disclosure is to produce an arrangement of the fibers within a torsion-loaded spring wire in which all of the fibers in all of the cross-sectional regions of the spring wire are utilized as effectively or homogeneously as possible in terms of loading, in order to achieve the highest possible mass-related energy storage density. Therefore, the present disclosure concerns, at least in part, methods for designing such springs. In a helical spring, for instance, the spring wire (also spring bar) may be wound up as a helix. The spring, specifically the helical spring, may have a spring axis, around which the spring wire is led in the manner of a helix. The cross section of the spring wire may in some examples be annular, but may also be elliptical or polygonal or of some other cross section in other examples.

In particular, this object is achieved by achieving the following three part-objects:
the inner layers of the spring wire should likewise be load-bearing, that is to say highly utilized in terms of loading, even though the geometrical conditions mean that they are scarcely stretched,
tensile plies and compression plies should be utilized uniformly in terms of loading,
between the fiber plies, the matrix should transfer the least possible shearing forces or the lowest possible stresses, in order to prevent creep of the matrix and consequently of the spring as a whole.

The region of the torsion-loaded bar-shaped component merely comprises the spring supporting structure without the load introducing elements, such as for example adapted regions on the spring plate or spring restraint.

The following terms with the meanings given below are used hereinafter:

Tensile direction: Sign +
Compressive direction: Sign −
Bar axis:
An axis at the center of the spring wire along its longitudinal extent that is referred to as the spring wire axis or the spring bar axis or simply the bar axis.

Fiber angle $\alpha_j$:
The fiber angle indicates the differential angle of the fiber orientation in relation to the bar axis.

Ply $L_i$:
A ply may be a combination of a number of layers, for example a ply comprising a multiaxial nonwoven fabric, a helix winding and a braided fabric generally contains two layers with different fiber orientations (in each case a + layer and a − layer; for example +−45°). The layers of the ply are usually connected to one another (for example crimped or knitted or sewn or fixed by a material bond).

A ply comprising a UD (unidirectional) nonwoven fabric on the other hand generally only contains one layer in an orientation of aligned fibers.

However, a number of plies may also form a layer (a number of adjacent UD plies with the same angular orientation form a UD layer).

A ply generally consists of inorganic reinforcing fibers (for example basalt fibers, glass fibers), metallic reinforcing fibers (for example steel fibers), organic reinforcing fibers (for example carbon fibers, aramid fibers) or natural fibers (for example hemp fibers).

A ply has an assigned ply wall thickness $LW_i$.

A ply may also be a homogeneous plastic ply without reinforcing fibers and is classified as non-load-bearing (for example: outer termination of the arrangement).

A ply may also be a short- or long-fiber-reinforced plastic ply, in which the fibers are arranged without a preferential direction, and it is classified as non-load-bearing.

A ply may also consist of a metallic material ply (for example a terminating ply of metal sheet).

The ply numbering i increases from the inside to the outside.

Layer $S_i$:
In the case of continuous/textile-fiber-reinforced layers, all of the fibers of a layer $S_i$ have a uniform angular orientation $\alpha_j$.

In a layer there may however also be fibers of different materials $M_j$ alongside one another or mixed together.

Layers may also be homogeneous plastic plies without reinforcing fibers, plies with a short- or long-fiber-reinforced plastic ply, metallic plies or the like.

The layer numbering j increases from the inside to the outside.

The layers with a fiber angle in the range of 20° to 70° (in the tensile direction +) or −20° to −70° (in the compressive direction −) are referred to as load-bearing layers (preferably 30° to 60° (in the tensile direction +) or −30° to −60° (in the compressive direction −)).

A load-bearing layer serves for predominantly absorbing either tensile (sign +) stresses or compressive (sign −) stresses in the direction of the fibers.

All layers with angles outside the angular range of 20° to 70° (in the tensile direction +) or −20° to −70° (in the compressive direction −) are classified as non-load-bearing.

Cross-sectional area $A_{Sj}$:
Each layer has an assigned cross-sectional area $A_{Sj}$
The normal to the cross-sectional area is the bar axis.
For example in the case of an annular cross section, the calculation of the cross-sectional area is performed by using the formula for the area content of the annulus.

Layer axis:
Each layer has an axis which runs at the fiber angle $\alpha_j$ in relation to the bar axis and rotates with the progression of the layer in a helix along the bar axis.

Layer diameter $D_j$:
Arithmetically averaged diameter of the inside diameter and outside diameter of the corresponding layer.
For the case where, as with crimped plies (for example a braided fabric), two layers are derived, both layers have the same layer diameter.

Layer stiffness $E_{Sj}$: The layer stiffness $E_{Sj}$ corresponds to the single or mixed module of all the fiber and matrix components of the respective layer (in accordance with the mixing rule in classical laminate theory (for example Puck, Tsai, Niederstadt, Geier) transformed to an orientation of +/−45° in relation to the bar axis.
Only absolute values are used.
Calculation formula for the layer stiffness $E_{Sj}$:

$$\frac{1}{E_{S_j}} = \frac{c^2}{E_1}(c^2 - s^2 \nu_{12}) + \frac{s^2}{E_2}(s^2 - c^2 \nu_{21}) + \frac{c^2 s^2}{G_{12}} \text{ with } c =$$

$$\cos(|\alpha| - 45°) \text{ and } s = \sin(|\alpha| - 45°)$$

$E_{Sj}$—layer stiffness, $E_1$—stiffness longitudinally in relation to the fiber of the material $M_j$, $E_2$—stiffness transversely in relation to the direction of the fiber of the material $M_j$, $G_{12}$—shear modulus of the material $M_j$, $\nu_{12}$—great Poisson's ratio of the material $M_j$, $\nu_{21}$—small Poisson's ratio of the material $M_j$.

Group $G_k$:
One or more load-bearing layers of one loading direction (tensile or compressive alignment) lying against one another together respectively form a group $G_k$.
The group formation is independent of the materials used or association of the plies.
Layers or plies classified as non-load-bearing are not taken into consideration in the assessment of the state of lying against one another, and so even layers that are not physically touching may be regarded as lying against one another.
The counting of the groups begins from the inside.

Group axis: According to tensile or compressive alignment, each group has a group axis which runs at +45° (tensile) or −45° (compression) to the bar axis and rotates with the progression of the layer in a helix along the bar axis.

Group stiffness $E_{G_k}$: The group stiffness $E_{G_k}$ corresponds to the single or mixed module, transformed in the direction of the group axis and area-weighted, of all the fiber and matrix components of the respective group (in accordance with the mixing rule in classical laminate theory (for example Puck, Tsai, Niederstadt, Geier).
Only absolute values are used.
Calculation formula for the group stiffness $E_{G_k}$:

$$E_{G_k} = \frac{\sum_j E_{S_j} A_{S_j}}{\sum_j A_{S_j}} \text{ where layers } j \text{ belong to group } k$$

$E_{G_k}$—group stiffness of the group k, $E_{Sj}$—layer stiffness of the layer j,
$A_{Sj}$—cross-sectional area of the layer j Group extensional stiffness $F_{G_k}$:
Product of group stiffness and assigned cross-sectional area of the group
Calculation formula for the group extensional stiffness $F_{G_k}$:

$$F_{G_k} = E_{G_k} \times \sum_j A_{S_j} \text{ where layers } j \text{ belong to group } k$$

$F_{G_k}$—group extensional stiffness of the group k, $E_{G_k}$—group stiffness of the group k, $A_{Sj}$—cross-sectional area of the layer j.

Pair $P_n$:
Two groups lying against one another respectively form a pair (the group formation necessarily has the effect that a pair always consists of two groups with a group axis +45° and −45°)
Layers or plies classified as non-load-bearing are not taken into consideration in the assessment of the state of lying against one another, and so even groups that are not physically touching may be regarded as lying against one another.
The pair formation begins with the innermost group and is continued successively outward.
A group already successfully assigned to a pair cannot form a pair with another group lying against it.

Group ratio $GV_n$:
The groups in a pair are assigned a group ratio as follows: group extensional stiffness of the group with group axis +45° divided by group extensional stiffness of the group with group axis −45° (the group extensional stiffnesses do not in this case have a sign, because only absolute values of the group stiffness are included in the calculation)

Pair ratio $PV_n$:
Two pairs lying against one another are assigned a pair ratio as follows: stiffness of the inner pair divided by stiffness of the pair lying against it.

Compression set:
All of the groups of the compressive direction form the compression set.
The groups in the set are sorted from the inside to the outside.

Tensile set:
　All of the groups of the tensile direction form the tensile set.
　The groups are sorted from the inside to the outside.
　Mixed fiber A roving or fiber bundle that is composed of filaments of different materials.

For the further considerations of the design method and the fiber arrangement in the spring wire, an ideal coincidence of the calculated or defined fiber angles $\alpha_j$ in the finished component is assumed. Any angular displacements, from the calculated values respectively in the + and − directions, due to forming operations (for example: the winding up of the stretched spring wire along the spring axis into a helix), plant-specific production deviations (for example: fluctuations of the rotational speed of the winding machine) or displacements due to handling operations (for example: manual transport of the intermediate products) in the finished component are not relevant to the findings of the design method presented, as long as the absolute angular difference is less than 20°, preferably less than 10° and most particularly preferably less than 5°.

The preferred method for designing the spring according to the invention provides that:

A pre-design of the spring is performed on the basis of empirical values and in accordance with the prior art. The parameters of this spring are used as starting parameters for optimizing the spring in accordance with the method according to the invention.

All of the design steps that are set out below must be carried out iteratively on their own or together repeatedly in order to satisfy all of the required design criteria in one looping process.

Step 1:

In a first step, the structure of the spring wire is made such that in one of the two sets the group stiffness of adjacent groups decreases from the inside to the outside at least once. Respectively in a set, further groups preferably have a group stiffness that is the same from the inside to the outside or a group stiffness that decreases from the inside to the outside. Particularly preferably, the group stiffness of adjacent groups decreases from the inside to the outside over the entire radius of the spring wire and in both sets.

This is achieved for example by means of one of the following possibilities or a combination of two or three of the following possibilities:

Possibility I: Different fiber materials
　For this possibility, fibers of high stiffness (for example UHM-CF) are used in the inner groups, fibers of medium stiffness (for example IM-CF) are used in the middle groups, stiff fibers (for example HT-CF) are used further to the outside and fibers of low stiffness (for example GF) are used in the outer groups.

Possibility II: Different fiber angles
　The fine tuning of the stiffnesses may be accomplished by the fiber angles in the layers, so that in the case of a number of layers of the same material the stiffness can nevertheless be adapted from the inside to the outside by the fiber angle.

Possibility III: Mixture of different fibers
　If the differences in stiffness become too great for a balance to be types may also be used in the layers of one group or else from one group to the next.

Step 2:

Pairs are then formed from the inside to the outside. The cause of the problem of creep of the matrix material in the case of continuous loads is generally a very high shear stress between the groups in the spring. To avoid shear stresses between the groups, the groups of a pair should have comparable group extensional stiffnesses, which can be influenced for example by means of the cross-sectional area, the fiber volume content, the fiber angle or the material selection. The two group extensional stiffnesses of a pair are used to calculate the group ratio. The group ratio must lie within a given range. The design method provides that the group ratio GV lies in the range of $0.2 <= GV <= 5$, preferably: $0.5 <= GV <= 2$ and most particularly preferably $0.75 <= GV <= 1.33$.

To achieve valid group ratios, it is for example necessary to compensate for the different material stiffnesses of different types of fiber by way of adapted cross-sectional areas. For this purpose, in a preferred procedure the fiber stiffness is chosen to correspond to the utilization capacity of the fibers in terms of loading. Thus, UHM-CF for example can only absorb low compressive loads and therefore preferably can be efficiently used for tensile-loaded layers. IM-CF fibers have good compressibility, and therefore can also be used well for compression-loaded layers. For example, a tensile-loaded group of UHM-CF fibers and a compression-loaded group of IM-CF fibers thus form a pair with in each case only one layer. The tensile-loaded group (UHM-CF) then has a higher group stiffness than the compression-loaded group (IM-CF). In order to set a preferred group ratio, it is possible to adapt the layer wall thickness, and consequently the cross-sectional area. The product of group stiffness and assigned cross-sectional area forms the group extensional stiffness. For the pair consisting of UHM-CF and IM-CF fibers, the layer wall thicknesses may be for example 1 mm for the tensile-loaded group and 1.5 mm for the compression-loaded group. Consequently, the group extensional stiffnesses for the tensile-loaded group and the compression-loaded group can be made similar by way of the assigned cross-sectional areas, and the group ratio has a value within the desired range. Consequently, there are virtually no shear stresses between the groups and the spring wire consequently has an advantageous creep behavior.

Further preferred embodiments envisage the use of one or more intermediate or outer layers that are very thin, and consequently scarcely contribute to the load-bearing behavior of the component, which by their fiber orientation contribute for example to the stiffness of the spring with respect to transverse force or represent a terminating layer with respect to medial environmental, loading. However, according to the invention only a maximum of 25%, preferably 15%, particularly preferably 5%, of the spring wire mass (without core) should consist of layers that are classified as non-load-bearing.

Also preferred is the use of a spring wire in which the groups of the spring wire consist at least in a proportion of 50%, preferably of 75% and particularly preferably of 95%, of the total mass of the spring wire (without core) of groups that have within the tensile set and the compression set a group stiffness that decreases or remains the same from the inside to the outside.

Also preferred is the use of a spring wire in which the groups of the spring wire have at least in a proportion of 50%, preferably of 75% and particularly preferably of 95%, of the total mass of the spring wire (without core) been successfully assigned to a pair.

Also preferred is the application of an outer plastic ply or ply of matrix material without fiber reinforcement. However, the method according to the invention provides that at least 75%, preferably 85%, particularly preferably 95%, of the elastic energy in the case of loading is stored by the fiber composite material and not by the outer plastic ply. This also includes the possibility of the outer plastic ply tearing, but the fiber-reinforced plies and the optionally present core remaining undamaged.

The computational design of the spring according to the invention is preferably performed in a computer-aided manner. The method according to the invention provides that, after the design, the spring is produced by methods from the prior art.

According to the invention, the load-bearing spring cross section (coatings and so on that are non-load-bearing are ignored) is adapted in its stiffness properties in such a way that there is a homogeneous utilization of the material in terms of loading over the entire cross section of the spring wire. This preferably takes place by the layer stiffness decreasing in the radial direction, starting from the bar axis. In particular, the group stiffness decreases from the inside to the outside, in order to compensate for the underloading of the inner plies or the overloading of the outer plies. The spring is preferably designed such that the loading limit in all of the plies is reached virtually at the same time.

The spring bar of the spring according to the invention preferably has a circular cross section. However, elliptical or polygonal cross sections are also possible. The spring optionally has a core. This preferably consists of fiber composite material, in the case of which the fibers run unidirectionally, parallel to the bar axis. Further preferred embodiments provide a hollow core, in the case of which an axial hollow space is surrounded by a fiber composite material or an unreinforced plastic surround. Also preferred is a core that consists completely of plastic or a core that is formed exclusively by a hollow space.

It is also preferred for adjacent pairs to form a pair ratio deviating only a little from one another, so that also lowest possible shear stresses occur between the pairs, and consequently the spring wire has a lowest possible tendency to creep. This pair ratio is calculated from the stiffnesses of the groups of the two pairs.

The spring according to the invention is preferably used in vehicle construction, for motor vehicles and rail vehicles. However, use is conceivable in all areas of use of helical springs, or generally torsion springs, in the case of which the environmental conditions do not attack the materials that are used for the spring to an inadmissible extent.

In all of the exemplary embodiments, the calculation of the cross-sectional area is performed by using the formula for the cross section of an annulus. For the respective exemplary embodiments, the specific situations are described by a sectional representation of the spring wire, a table to describe the spring wire characteristic values and a table to present the assigned material characteristic values.

Figure 5:
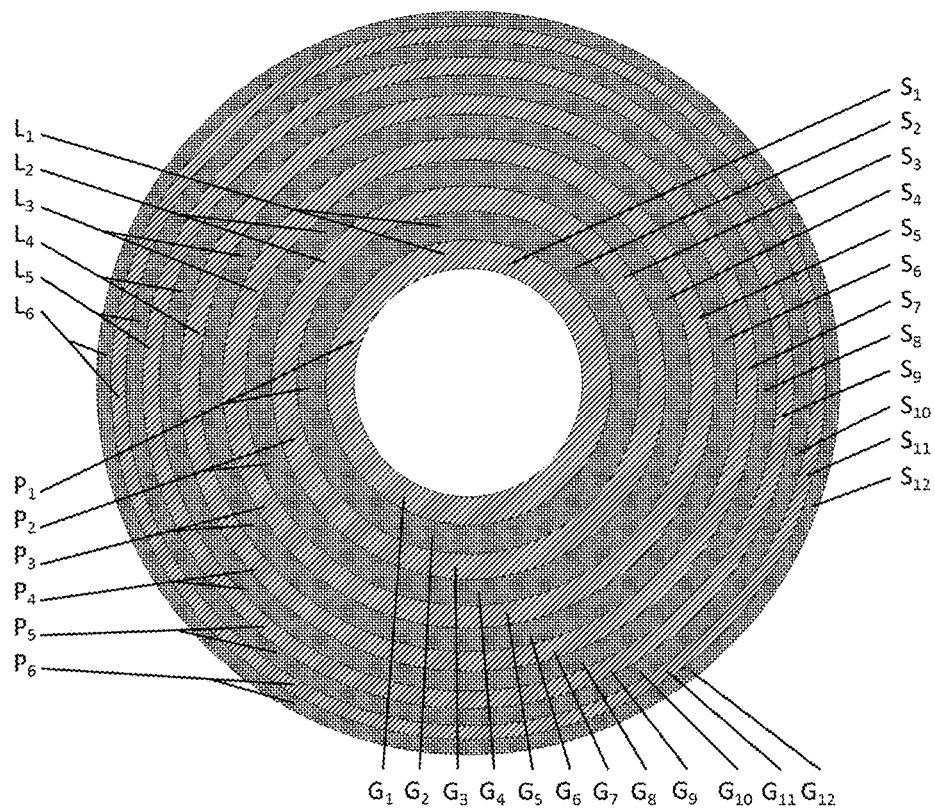
FIG. 5 is a schematic cross-sectional view of an example spring of exemplary embodiment 1 with a braided textile and a core diameter of 4 mm (Tables 1 and 2).

Exemplary embodiment 1 (Table 1) shows a simple configuration of the spring according to the invention, which consists of six plies of a braided textile and a hollow core of 4 mm in diameter. The braided fabric plies form the twelve load-bearing layers. According to the convention, a ply is divided into a tensile-loaded layer and a compression-loaded layer, which both have the same layer radius. In FIG. 5, the cross section of the spring wire is schematically represented. For illustrative reasons, in the breakdown the compression-loaded layer is always shown on the inside. The calculation is nevertheless carried out according to the convention (Table 1). Exemplary embodiment 1 only has layers that are classified as load-bearing layers. The textile plies are arranged such that, as broken-down layers, they have a fiber angle of +45° and −45° in relation to the bar axis. The braided fabric plies have from the inside to the outside materials according to Table 2. In this case, the materials are selected such that the material stiffness decreases from the inside to the outside along the fiber. This behavior is also retained after the transformation (in this case without changing the numerical value) in the direction of the layer axis, which is reflected in a reduction in the layer and group stiffnesses from the inside to the outside. The layers are alternately in the compressive direction and tensile direction, which has the consequence that each layer forms an individual group. Once the groups are sorted from the inside to the outside and according to compressive loading and tensile loading, the compression set: ($G_1$, $G_3$, $G_5$, $G_7$, $G_9$, $G_{11}$) is obtained for the compressive loading and the tensile set ($G_2$, $G_4$, $G_6$, $G_8$, $G_{10}$, $G_{12}$) is obtained for the tensile loading. The individual sets have in this case a group stiffness that decreases from the inside to the outside. The pair formation, beginning from the inside, proceeds successfully for all of the groups since the relationships of the group extensional stiffnesses lie within the required ranges. Six pairs are formed, all having the group ratio of 1. In exemplary embodiment 1, 100% of the mass of the spring wire lies in groups with a group stiffness that decreases or remains the same from the inside to the outside. At the same time, all of the groups are assigned to pairs. Consequently, according to the invention, exemplary embodiment 1 is a preferred embodiment with uniform material utilization in terms of loading and a low creep tendency.

Figure 6:
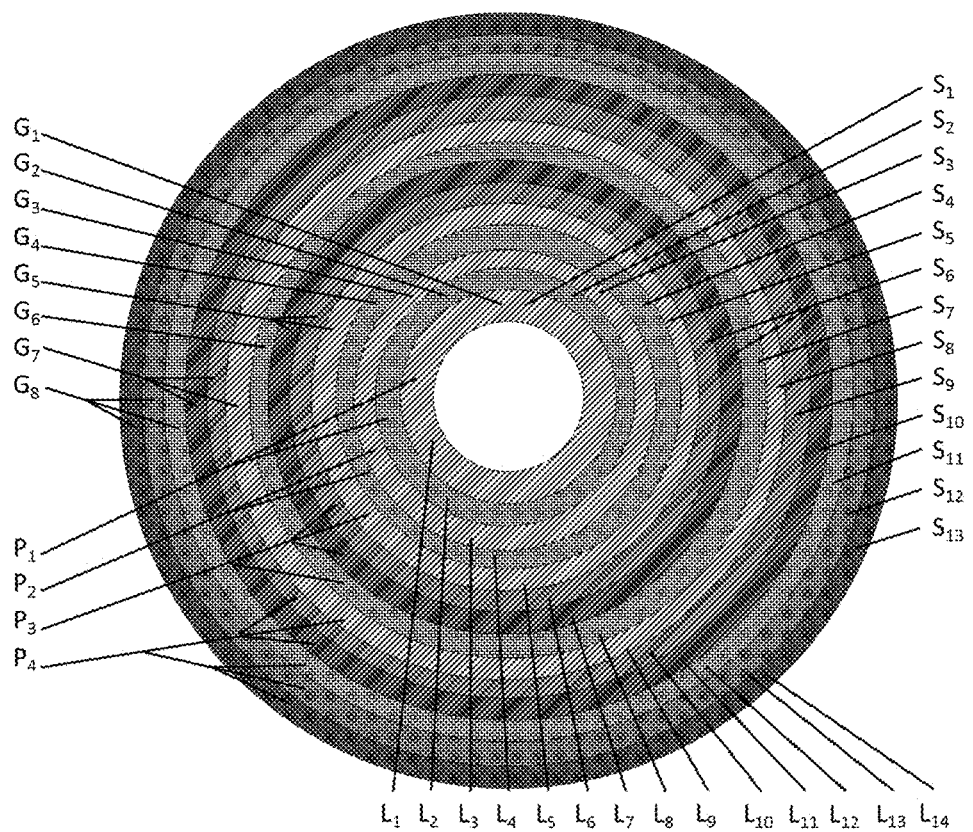
FIG. 6 is a schematic cross-sectional view of an example spring of exemplary embodiment 2 with a wound textile such as on a coiling machine, for example, and a core diameter of 3.5 mm (Tables 3 and 4).

In exemplary embodiment 2 (Tables 3 and 4) there is a spring wire arrangement according to the invention that can be produced for example in a coiling process according to the prior art and has altogether 14 plies. The representation in FIG. 6 corresponds to the basic structure with the wound plies and the hollow core of 3.5 mm in diameter. The first two layers ($S_1$ and $S_2$), which also form the first two groups ($G_1$ and $G_2$), demonstrate the case that the fiber stiffness is chosen to correspond to the utilization capacity of the fibers in terms of loading. IM carbon fibers with higher compressive strength are used for the compression-loaded layer and UHM carbon fibers are used for the tensile-loaded layer. In order that the two groups exhibit a behavior with as little shear stress as possible in the pair formation, the group extensional stiffnesses of the two groups ($G_1$ and $G_2$) are approximated to one another by way of adapting the layer wall thickness, so that their ratio lies within the range of the particularly preferred group ratio. The further outward-lying plies 5, 6 and 7 form two layers. Due to the technically possible deposition of the same fiber material and same fiber angle to the bar axis, the plies 6 and 7 form only one layer ($S_6$). The layers $S_5$ and $S_6$ result in the group $G_5$, because they are a number of load-bearing layers of one loading direction lying against one another. Group 7 ($G_7$) shows how the methodology dictates that layers ($S_8$, $S_9$ and $S_{10}$) in one loading direction are grouped together. These layers have layer stiffnesses differing in their magnitude, which are caused by different fiber materials and different fiber angles. The group stiffness of group 7 is calculated as the area-averaged arithmetic mean of the layers associated with the group. In exemplary embodiment 2, the sets for tensile loading and compressive loading have group stiffnesses decreasing from the inside to the outside, and consequently uniform utilization in terms of loading. The pairs successfully formed on the basis of the group extensional stiffnesses lie within the range of the preferred group ratios.

Figure 7:
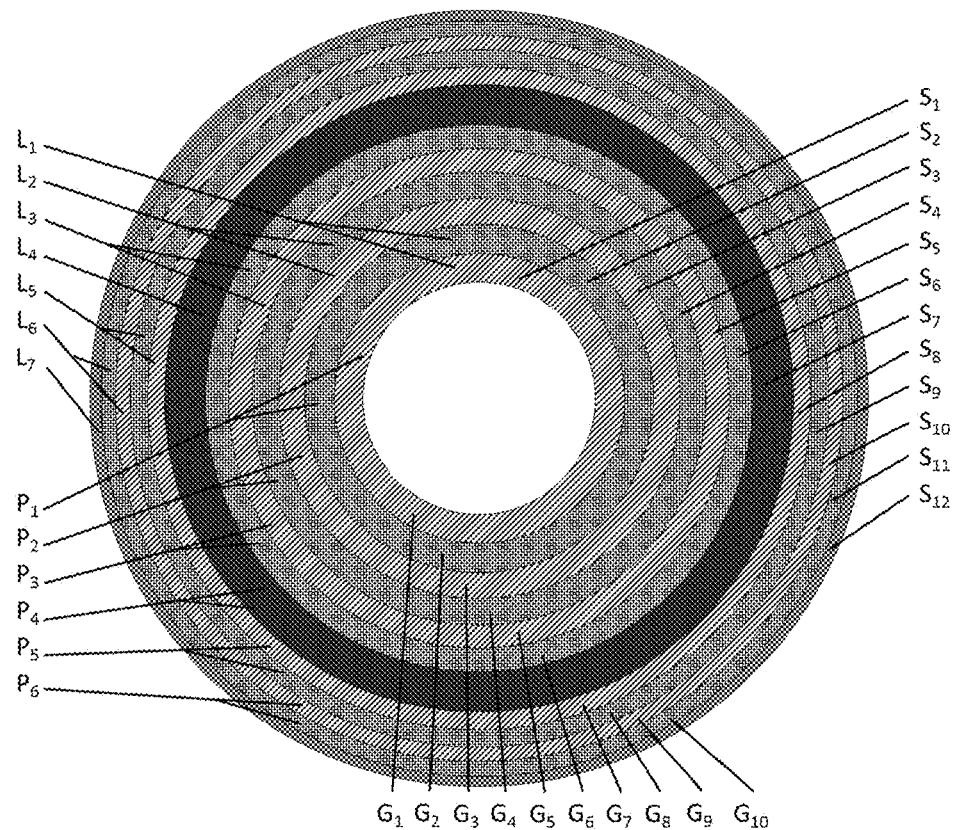
FIG. 7 is a schematic cross-sectional view of an example spring of exemplary embodiment 3 with a braided textile wherein a fourth ply is a UD nonwoven fabric and a homogeneous plastic outer ply lying on the outside of the spring (Tables 5 and 6).

In exemplary embodiment 3 (Tables 5 and 6), a more complex construction of the spring according to the invention is represented. The construction corresponds to the representation in FIG. 7. From the inside to the outside, the spring wire is composed of three plies of braided textile ($L_1$, $L_2$ and $L_3$), followed by a wound ply ($L_4$), followed by two plies of braided textile ($L_5$ and $L_6$) and finally followed by an exclusively plastic ply ($L_7$). For the braided textile plies, the layer and group assignment and the pair formation take place in a way analogous to exemplary embodiment 1. A departure from this is the situation where the material that is used also comprises mixed fibers, of in this case the base fiber types low-alkali glass and HT carbon fibers. These are composed in their mass fractions in such a way as to result in different stiffnesses, in particular in the longitudinal direction of the fibers. Use of the mixed fibers in the braided textiles allow the great differences in stiffness between the glass fiber and the carbon fiber to be compensated better. As a delimitation from exemplary embodiment 1, a further major difference is the plies $L_4$ and $L_7$, which are classified as non-load-bearing, and consequently cannot form groups. Ply 4 consists here of a carbon fiber ply with a fiber angle of 0°. This is a layer with a fiber angle outside the range of 20° to 70° or the range of −20° to −70°, which is therefore classified as non-load-bearing. Such a layer has an advantageous effect on the transverse load insensitivity of the spring wire wound as a helix around the spring axis, and is therefore appropriate to some extent. The ply 7 is similarly a non-load-bearing layer because, as a homogeneous plastic ply, it does not have preferential fiber reinforcement in the tensile-oriented or compression-oriented loading direction. Rather, the ply 7 represents the outward termination of the spring wire in relation to the surroundings. Possible functions here are that of shielding from medial ambient influences, possible impact protection (for example the impact of stones), tribological resistance (for example a friction-resistant protective layer in the spring plates) or the prevention of contact corrosion. The non-load-bearing layers have a mass fraction of 21% with respect to the total mass of the cross section of the spring wire (the mass of a possibly present spring wire core is not taken into consideration for the calculation). Since, in this variant according to the invention, the group stiffnesses decrease from the inside to the outside and the methodology dictates that all of the groups successfully form pairs, the groups represent a mass fraction of more than 75% for both requirements, and consequently this exemplary embodiment 3 is a preferred arrangement.

LIST OF DESIGNATIONS $L_i$ Ply i (counting index i on the closed interval of natural numbers [1,I])
$LW_i$ Ply wall thickness of the ply i
$S_j$ Layer j (counting index j on the closed interval of natural numbers [1,J])
$\alpha_j$ Angular orientation in relation to the bar axis of the layer $S_j$
Core of the spring wire (optionally present)
$M_j$ Material of the layer $S_j$
$D_j$ Layer diameter of the layer $S_j$
$W_j$ Layer wall thickness of the layer $S_j$
$E_{S_j}$ Layer stiffness of the layer $S_j$
$E_1$ Stiffness longitudinally in relation to the fiber of the material $M_j$
$E_2$ Stiffness transversely in relation to the direction of the fibers of the material $M_j$
$G_{12}$ Shear modulus of the material $M_j$
$\nu_{12}$ Large Poisson's ratio of the material $M_j$
$\nu_{21}$ Small Poisson's ratio of the material $M_j$
$G_k$ Group k (counting index k on the closed interval of natural numbers [1,K])
$A_{S_j}$ Cross-sectional area of the layer $S_j$
$E_{G_k}$ Group stiffness of the group $G_k$
$F_{G_k}$ Group extensional stiffness of the group $G_k$
$P_n$ Pair n (counting index n on the closed interval of natural numbers [1,N])
$GV_n$ Group ratio n, calculated from a tensile-loaded group and a compression-loaded group
$D_a$ Spring wire outside diameter
CF Carbon fiber
BF Basalt fiber
GF Glass fiber
S2 Glass fiber with higher stiffness
E Glass fiber with normal stiffness
UHM Carbon fiber with very high stiffness (Ultra High Modulus)
IM Carbon fiber with high stiffness (Intermediate Modulus)
HT Carbon fiber with normal stiffness (High Tenacity)

TABLE 1

| Ply $L_i$ | Layer $S_j$ | Group $G_k$ | Pair $P_n$ | Classification | Loading | Orientation [degrees] | Material $M_j$ | Ply wall thickness $LW_i$ [mm] | Layer wall thickness $W_j$ [mm] |
|---|---|---|---|---|---|---|---|---|---|
| 1 | 1 | 1 | 1 | load-bearing | compression | −45 | 1 | 2 | 1 |
|   | 2 | 2 |   | load-bearing | tensile | 45 | 1 |   | 1 |
| 2 | 3 | 3 | 2 | load-bearing | compression | −45 | 2 | 1.8 | 0.9 |
|   | 4 | 4 |   | load-bearing | tensile | 45 | 2 |   | 0.9 |
| 3 | 5 | 5 | 3 | load-bearing | compression | −45 | 3 | 1.6 | 0.8 |
|   | 6 | 6 |   | load-bearing | tensile | 45 | 3 |   | 0.8 |
| 4 | 7 | 7 | 4 | load-bearing | compression | −45 | 4 | 1.4 | 0.7 |
|   | 8 | 8 |   | load-bearing | tensile | 45 | 4 |   | 0.7 |
| 5 | 9 | 9 | 5 | load-bearing | compression | −45 | 5 | 1.2 | 0.6 |
|   | 10 | 10 |   | load-bearing | tensile | 45 | 5 |   | 0.6 |
| 6 | 11 | 11 | 6 | load-bearing | compression | −45 | 6 | 1 | 0.5 |
|   | 12 | 12 |   | load-bearing | tensile | 45 | 6 |   | 0.5 |

TABLE 1-continued

| Ply $L_i$ | Layer diameter $D_j$ [mm] | Cross-sectional area $As_j$ [mm²] | Mass [kg/m] | FVC [%] | Layer stiffness $Es_j$ [GPa] | Group stiffness $EG_k$ [GPa] | Group extensional stiffness $FG_k$ [kN] | Group Ratio $GV_n$ |
|---|---|---|---|---|---|---|---|---|
| 1 | 5 | 7.85 | 0.012 | 50% | 197 | 197 | 1547.2 | 1.00 |
|   | 5 | 7.85 | 0.012 | 50% | 197 | 197 | 1547.2 |  |
| 2 | 6.9 | 9.75 | 0.015 | 50% | 147 | 147 | 1433.9 | 1.00 |
|   | 6.9 | 9.75 | 0.015 | 50% | 147 | 147 | 1433.9 |  |
| 3 | 8.6 | 10.81 | 0.016 | 50% | 116 | 116 | 1253.6 | 1.00 |
|   | 8.6 | 10.81 | 0.016 | 50% | 116 | 116 | 1253.6 |  |
| 4 | 10.1 | 11.11 | 0.023 | 50% | 49 | 49 | 544.2 | 1.00 |
|   | 10.1 | 11.11 | 0.023 | 50% | 49 | 49 | 544.2 |  |
| 5 | 11.4 | 10.74 | 0.020 | 50% | 44.7 | 44.7 | 480.3 | 1.00 |
|   | 11.4 | 10.74 | 0.020 | 50% | 44.7 | 44.7 | 480.3 |  |
| 6 | 12.5 | 9.82 | 0.018 | 50% | 37.9 | 37.9 | 372.1 | 1.00 |
|   | 12.5 | 9.82 | 0.018 | 50% | 37.9 | 37.9 | 372.1 |  |

TABLE 2

| Material no. | Type | Stiffness class | Example configuration [GPa] - 50% FVC | | | | | |
|---|---|---|---|---|---|---|---|---|
|   |   |   | Density [kg/m³] | E1 [GPa] | E2 [GPa] | nu12 | nu21 | G12 [GPa] |
| 1 | CF | UHM | 1500 | 197 | 4.4 | 0.35 | 0.008 | 2.1 |
| 2 | CF | IM | 1500 | 147 | 5.4 | 0.28 | 0.01 | 2.3 |
| 3 | CF | HT | 1500 | 116 | 5.4 | 0.28 | 0.01 | 2.3 |
| 4 | BF |  | 2050 | 49 | 6.5 | 0.29 | 0.04 | 2.5 |
| 5 | GF | S2 | 1870 | 44.7 | 6.4 | 0.29 | 0.04 | 2.4 |
| 6 | GF | E | 1870 | 37.9 | 5.7 | 0.29 | 0.04 | 2.1 |

TABLE 3

| Ply $L_i$ | Layer $S_j$ | Group $G_k$ | Pair $P_n$ | Classification | Loading | Orientation [degrees] | Material $M_j$ | Ply wall thickness $LW_i$ [mm] | Layer wall thickness $W_j$ [mm] |
|---|---|---|---|---|---|---|---|---|---|
| 1 | 1 | 1 | 1 | load-bearing | compression | −45 | 2 | 1.5 | 1.5 |
| 2 | 2 | 2 |  | load-bearing | tensile | 45 | 1 | 1 | 1 |
| 3 | 3 | 3 | 2 | load-bearing | compression | −45 | 2 | 1 | 1 |
| 4 | 4 | 4 |  | load-bearing | tensile | 45 | 2 | 1 | 1 |
| 5 | 5 | 5 | 3 | load-bearing | compression | −40 | 3 | 1 | 1 |
| 6 | 6 |  |  | load-bearing |  | −45 | 4 | 1 | 2 |
| 7 |  |  |  | load-bearing |  | −45 | 4 | 1 | 1 |
| 8 | 7 | 6 |  | load-bearing | tensile | 40 | 3 | 1 | 1 |
| 9 | 8 | 7 | 4 | load-bearing | compression | −45 | 5 | 1 | 1 |
| 10 | 9 |  |  | load-bearing |  | −40 | 6 | 1 | 1 |
| 11 | 10 |  |  | load-bearing |  | −30 | 6 | 1 | 1 |
| 12 | 11 | 8 |  | load-bearing | tensiile | 45 | 6 | 1 | 1 |
| 13 | 12 |  |  | load-bearing |  | 40 | 6 | 1 | 1 |
| 14 | 13 |  |  | load-bearing |  | 35 | 5 | 1 | 1 |

| Ply $L_i$ | Layer diameter $D_j$ [mm] | Cross-sectional area $As_j$ [mm²] | Mass [kg/m] | FVC [%] | Layer stiffness $ES_j$ [GPa] | Group stiffness $EG_k$ [GPa] | Group extensional stiffness $FG_k$ [kN] | Group Ratio $GV_n$ |
|---|---|---|---|---|---|---|---|---|
| 1 | 4.25 | 10.01 | 0.016 | 60% | 175.0 | 175.0 | 1752.4 | 1.16 |
| 2 | 5.5 | 8.64 | 0.013 | 60% | 235.0 | 235.0 | 2030.3 |  |
| 3 | 6.5 | 10.21 | 0.016 | 60% | 175.0 | 175.0 | 1786.8 | 1.15 |
| 4 | 7.5 | 11.78 | 0.018 | 60% | 175.0 | 175.0 | 2061.7 |  |
| 5 | 8.5 | 13.35 | 0.021 | 60% | 101.4 | 70.9 | 3176.2 | 0.58 |
| 6 | 10 | 31.42 | 0.066 | 60% | 58.0 |  |  |  |
| 7 |  |  |  | 60% |  |  |  |  |
| 8 | 11.5 | 18.06 | 0.028 | 60% | 101.4 | 101.4 | 1832.0 |  |
| 9 | 12.5 | 19.63 | 0.038 | 60% | 53.0 | 40.4 | 2570.2 | 1.22 |
| 10 | 13.5 | 21.21 | 0.041 | 60% | 47.4 |  |  |  |
| 11 | 14.5 | 22.78 | 0.044 | 60% | 23.1 |  |  |  |

TABLE 3-continued

| | | | | | | | |
|---|---|---|---|---|---|---|---|
| 12 | 15.5 | 24.35 | 0.047 | 60% | 44.8 | 40.3 | 3130.2 |
| 13 | 16.5 | 25.92 | 0.050 | 60% | 40.3 | | |
| 14 | 17.5 | 27.49 | 0.053 | 60% | 36.2 | | |

TABLE 4

| | | | Example configuration [GPa] - 60% FVC | | | | | |
|---|---|---|---|---|---|---|---|---|
| Material no. | Type | Stiffness class | Density [kg/m³] | E1 [GPa] | E2 [GPa] | nu12 | nu21 | G12 [GPa] |
| 1 | CF | UHM | 1550 | 235 | 4.6 | 0.35 | 0.007 | 2.4 |
| 2 | CF | IM | 1550 | 175 | 6.2 | 0.26 | 0.01 | 2.8 |
| 3 | CF | HT | 1550 | 139 | 6.3 | 0.26 | 0.01 | 2.7 |
| 4 | BF | | 2100 | 58 | 8 | 0.28 | 0.04 | 3 |
| 5 | GF | S2 | 1930 | 53 | 7.8 | 0.28 | 0.04 | 2.9 |
| 6 | GF | E | 1930 | 44.8 | 6.9 | 0.27 | 0.04 | 2.6 |

TABLE 5

| Ply $L_i$ | Layer $S_j$ | Group $G_k$ | Pair $P_n$ | Classification | Loading | Orientation [degrees] | Material $M_j$ | Ply wall thickness $LW_i$ [mm] | Layer wall thickness $W_j$ [mm] |
|---|---|---|---|---|---|---|---|---|---|
| 1 | 1 | 1 | 1 | load-bearing | compression | −45 | 1 | 2 | 1 |
| | 2 | 2 | | load-bearing | tensile | 45 | 1 | | 1 |
| 2 | 3 | 3 | 2 | load-bearing | compression | −45 | 2 | 1.8 | 0.9 |
| | 4 | 4 | | load-bearing | tensile | 45 | 2 | | 0.9 |
| 3 | 5 | 5 | | load-bearing | compression | −45 | 3 | 1.6 | 0.8 |
| | 6 | 6 | 3 | load-bearing | tensile | 45 | 3 | | 0.8 |
| 4 | 7 | | | non-load-bearing | | 0 | 1 | 1.4 | 1.4 |
| 5 | 8 | 7 | 4 | load-bearing | compression | −45 | 4 | 1.2 | 0.6 |
| | 9 | 8 | | load-bearing | tensile | 45 | 4 | | 0.6 |
| 6 | 10 | 9 | 5 | load-bearing | compression | −45 | 5 | 1 | 0.5 |
| | 11 | 10 | | load-bearing | tensile | 45 | 5 | | 0.5 |
| 7 | 12 | | | non-load-bearing | | | 6 | 0.5 | 0.5 |

| Ply $L_i$ | Layer diameter $D_j$ [mm] | Cross-sectional area $As_j$ [mm²] | Mass [kg/m] | FVC [%] | Layer stiffness $Es_j$ [GPa] | Group stiffness $EG_k$ [GPa] | Group extensional stiffness $FG_k$ [kN] | Group Ratio $GV_n$ |
|---|---|---|---|---|---|---|---|---|
| 1 | 5 | 7.85 | 0.012 | 60% | 139 | 139 | 1091.7 | 1.00 |
| | 5 | 7.85 | 0.012 | 60% | 139 | 139 | 1091.7 | |
| 2 | 6.9 | 9.75 | 0.016 | 60% | 122 | 122 | 1190.1 | 1.00 |
| | 6.9 | 9.75 | 0.016 | 60% | 122 | 122 | 1190.1 | |
| 3 | 8.6 | 10.81 | 0.019 | 60% | 96 | 96 | 1037.5 | 1.00 |
| | 8.6 | 10.81 | 0.019 | 60% | 96 | 96 | 1037.5 | |
| 4 | 10.1 | 22.21 | 0.034 | 60% | non-load-bearing | non-load-bearing | non-load-bearing | non-load-bearing |
| 5 | 11.4 | 10.74 | 0.020 | 60% | 70 | 70 | 752.1 | 1.00 |
| | 11.4 | 10.74 | 0.020 | 60% | 70 | 70 | 752.1 | |
| 6 | 12.5 | 9.82 | 0.019 | 60% | 53 | 53 | 520.3 | 1.00 |
| | 12.5 | 9.82 | 0.019 | 60% | 53 | 53 | 520.3 | |
| 7 | 13.25 | 10.41 | 0.012 | Plastic only | non-load-bearing | non-load-bearing | non-load-bearing | non-load-bearing |

TABLE 6

| | | | Example configuration [GPa] - 60% FVC | | | | | |
|---|---|---|---|---|---|---|---|---|
| Material no. | Type | Stiffness class | Density [kg/m³] | E1 [GPa] | E2 [GPa] | nu12 | nu21 | G12 [GPa] |
| 1 | CF | HT | 1550 | 139 | 6.3 | 0.26 | 0.01 | 2.7 |
| 2 | 80% CF + 20% GF | 80% HT + 20% S2 | 1630 | 122 | 6.4 | 0.26 | 0.01 | 2.8 |
| 3 | 50% CF + 50% GF | 80% HT + 20% S2 | 1740 | 96 | 7.1 | 0.26 | 0.3 | 2.8 |
| 4 | 20% CF + 80% GF | 20% HT + 80% S2 | 1850 | 70 | 7.7 | 0.28 | 0.04 | 2.9 |
| 5 | GF | S2 | 1930 | 53 | 7.8 | 0.28 | 0.04 | 2.9 |
| 6 | Plastic | PA6 | 1140 | 2.8 | 2.8 | 0.3 | 0.3 | 1.1 |

What is claimed is:

1. A torsion spring configured as a bar spring or a helical spring comprising a spring wire of fiber composite material, the torsion spring comprising a plurality of layers of fiber reinforcement impregnated with a matrix material, wherein each of the plurality of layers comprises only tensile-loaded fibers or only compression-loaded fibers, wherein tensile-loaded groups of layers and compression-loaded groups of layers exist and a group stiffness of at least two groups of one or more layers differs, wherein a group stiffness of a first group of one or more load-bearing layers lying against one another differs from a group stiffness of a second group of one or more load-bearing layers lying against one another, wherein the layers of the first and second groups have a same loading direction.

2. The torsion spring of claim 1 wherein the group stiffness of groups of layers having different loading directions differs.

3. The torsion spring of claim 2 wherein the spring wire, without regard to a core mass, has a mass-related fraction of at most 25% in a form of layers classified as non-load-bearing.

4. The torsion spring of claim 1 wherein the group stiffness of the at least two groups of layers differs due to use of different fiber materials.

5. The torsion spring of claim 1 wherein the group stiffness of the at least two groups of layers differs due to use of mixed fibers as fiber materials.

6. The torsion spring of claim 1 wherein the group stiffness of the at least two groups of layers differs due to use of different fiber angles in the at least two groups of layers.

7. The torsion spring of claim 1 wherein the group stiffness decreases from an inside of the torsion spring to an outside of the torsion spring between at least two groups of layers in a set.

8. The torsion spring of claim 1 wherein a mass-related fraction, with respect to the spring wire but disregarding a core mass, of at least 50% in two sets of groups of layers has a group stiffness that decreases or remains constant from an inside of the torsion spring to an outside of the torsion spring.

9. The torsion spring of claim 1 wherein a mass-related fraction, with respect to the spring wire but disregarding a core mass, of at most 50% in two sets of groups of layers has a group stiffness that remains constant from an inside of the torsion spring to an outside of the torsion spring.

10. The torsion spring of claim 1 wherein at least one pair having a group ratio in a range of 0.2 to 5 is formed by two groups of layers.

11. The torsion spring of claim 1 wherein a mass-related fraction, with respect to the spring wire but disregarding a core mass, of at least 50% of groups of layers has formed pairs.

12. The torsion spring of claim 1 wherein for layers with a mixture of base fiber types, each base fiber type is in a mixed fiber layer in a proportion of at least 10% based on mass.

13. The torsion spring of claim 1 wherein the spring wire has a circular, ellipsoidal, or polygonal cross section.

14. The torsion spring of claim 1 wherein a matrix of fiber-reinforced plastic plies consists of a filled or unfilled thermosetting plastic.

15. The torsion spring of claim 1 wherein the spring wire comprises a core that is
   hollow,
   comprised of fiber-reinforced material with unidirectional fibers aligned in an axial direction of the spring wire, or
   comprised of material without fiber reinforcement.

16. A method of making a torsion spring from multi-ply fiber composite material, wherein the torsion spring is configured as a bar spring or as a helical spring, the method comprising:
   forming groups of fibers from layers of fiber reinforcement having a same loading direction lying one against another;
   determining a group stiffness for each of the groups of fibers;
   sorting the groups based on the group stiffnesses into two sets in a sequence from an inside to an outside of the torsion spring such that a tensile set consists of tensile-loaded groups and a compression set consists of compression-loaded groups;
   adapting the group stiffness within each set such that the group stiffness decreases or remains constant from the inside to the outside;
   forming pairs from the inside to the outside so that a tensile-loaded group and a compression-loaded group that are radially adjacent always form a pair;
   determining a group ratio as a quotient of a group extensional stiffnesses of the tensile-loaded and compression-loaded groups of a pair; and
   minimizing shear stresses between adjacent groups by varying stiffness ratios by at least one of varying layer wall thickness, varying a type of material, or varying fiber angles until the group ratio is in a range of 0.2 to 5.

17. The method of claim 16 further comprising pre-designing the torsion spring.

18. The method of claim 16 further comprising repeating the steps until a desirable load-bearing capacity with a spring stiffness profiled is achieved.

19. The method of claim 16 wherein the adapting the group stiffness comprises at least one of
   alternating a fiber material,
   alternating mixtures of different fiber materials, or varying fiber angles.

* * * * *